(12) United States Patent
Beardmore

(10) Patent No.: US 6,907,848 B2
(45) Date of Patent: Jun. 21, 2005

(54) CONNECTING ROD WITH LUBRICANT TUBE

(75) Inventor: John M. Beardmore, Howell, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/682,251

(22) Filed: Oct. 9, 2003

(65) Prior Publication Data

US 2005/0076858 A1 Apr. 14, 2005

(51) Int. Cl.[7] .................................................. F01P 1/04
(52) U.S. Cl. ................... 123/41.35; 74/579 E
(58) Field of Search .................. 123/197.1, 41.35; 74/579 R, 579 E

(56) References Cited

U.S. PATENT DOCUMENTS

| | | | | |
|---|---|---|---|---|
| 1,424,428 A | * | 8/1922 | Vincent | 123/54.8 |
| 1,628,652 A | * | 5/1927 | Carlson | 123/41.38 |
| 1,945,374 A | * | 1/1934 | Papaefthemeou | 74/579 E |
| 1,959,279 A | * | 5/1934 | Stearns | 74/579 R |
| 2,607,328 A | * | 8/1952 | Jencick | 123/197.1 |
| 3,482,467 A | * | 12/1969 | Volkel | 74/579 R |
| 4,142,484 A | * | 3/1979 | Buhl | 123/41.35 |
| 5,946,790 A | | 9/1999 | Graham et al. | 29/564 |
| 6,019,071 A | | 2/2000 | Maciejka, Jr. | 123/41.35 |

FOREIGN PATENT DOCUMENTS

DE    4325903 C1 * 9/1994    ............ F01M/1/06

\* cited by examiner

Primary Examiner—Noan P. Kamen
(74) Attorney, Agent, or Firm—Leslie C. Hodges

(57) ABSTRACT

A connecting rod includes a connecting rod body having a crank arm bore formed in a first end and a pin bore formed in a second end. A tube is connected to the body for carrying lubricant from the first end to the second end.

7 Claims, 4 Drawing Sheets

CONNECTING ROD WITH LUBRICANT TUBE

TECHNICAL FIELD

The present invention relates to a connecting rod having a tube positioned for carrying lubricant from one end of the connecting rod to another.

BACKGROUND OF THE INVENTION

In recent years, piston noise complaints have been on the rise. Piston noise includes "piston slap" and wrist pin knock or rattle. These noises are most frequently generated upon cold starting of the engine, but can also be manifest on hot restarts. Objection to piston noise continues to be a source of customer complaints. Even though normal piston noise is not indicative of eminent mechanical failure, customers may deem it as unacceptable and the engine as lacking quality.

Modern piston noise can be attributed to lateral instability of the piston assembly and lack of sufficient lubrication within the critical interfaces of the piston-to-bore and wrist pin joints. Severe packaging constraints and ever increasing power demands have led to very short piston designs with rotund skirt profiles. Furthermore, a challenging high temperature environment now exists for the piston and pin, which requires some means for supplemental cooling. In the past, the automotive piston/pin assembly has relied primarily on "splash" lubrication for cooling and noise control. However, relatively dry cylinder bores and pin joints have resulted for a number of reasons. Most notable of these contributors are tight crank bearing clearances (for low crank system noise) and aggressive piston ring designs (for reduced oil consumption). Unfortunately, these necessary refinements exacerbate the dry scenario for the reciprocating hardware. This is especially the case upon engine start up, as immediate lubrication is critical for "cushioning" the relevant interfaces involved with piston noise.

The advent of polymer coated piston skirts has enabled much tighter piston fit tolerances, which has addressed the aspect of piston stability with a remarkable reduction in piston noise. However, pin noise remains and piston noises can still be of concern in certain instances. Therefore, additional lubrication has become a fundamental requirement for the contemporary high performance engine. The most viable means of supplying added lube to the reciprocating hardware include rifle drilled rods, full time block mounted piston oilers, and connecting rod squirters. Full time block squirters consist of a nozzle that is mounted in the crankcase, near the bottom of each cylinder, which directs a steady stream of oil to the bottom side of the piston dome. To alleviate excessive demands on the oil pump, usually the nozzle head incorporates a check ball valve assembly. These check valves typically begin to flow when the supply pressure exceeds around 25 psi. The main benefit of block squirters is that of piston cooling, which can lower critical piston surface temperatures by 30° C. Disadvantages of common block squirters are that their targeting is much less effective for cold noise control, and they are difficult to package. Quite often, block squirters mandate that a notch be provided at the lower end of the piston squirt for clearance at bottom dead center. This is undesirable as it creates a stress riser in an area of the piston skirt, which is already under high stress. Further, block squirters are typically more expensive to implement and somewhat more likely to malfunction due to a plugged or sticky check valve.

Rifle drilled rods are less frequently employed in automotive engines than block squirters. This design includes a passage drilled through the entire length of the rod's column, thus connecting the wrist pin end to the big end of the rod. Oil is fed up through the center of the rod and directed as necessary to facilitate pin lubrication and/or to cool the piston under-dome. This technology is often used in large HD diesel engines. Its main advantage is communicating lubricant directly and internally right to the point of use for maximum effectiveness. The largest deterrents to gun drilled rods is the cost associated with drilling such a long, small diameter passage. The scrap rate can be excessive in weight conscious designs.

The most popular means for supplying added lube to the reciprocating hardware is connecting rod squirters, which incorporate a small orifice along the side of the rod. Rod squirters emit an intermittent spirt of oil, once per engine revolution, whenever the squirter hole in the rod aligns with the drilled lube passage in the crank's rod journal. Properly timed and targeted, the rod squirter can provide ample lube for the piston squirt thrust surfaces as well as for the wrist pin joints. The main advantages of rod squirters are that they usually package better than block squirters and do not place a huge demand on the oil supply system (i.e., the oil pump). Additionally, rod squirters are generally less expensive than block squirters.

One shortcoming of rod squirters and block squirters is that they may be adversely affected by crankcase windage.

SUMMARY OF THE INVENTION

The invention provides a connecting rod having an external tube which is connected to a connecting rod body for carrying lubricant from the crank arm bore end to the pin bore end of the connecting rod body for well targeted lubrication. This design is much less affected by crankcase windage than rod or block squirters, and is readily adaptable to existing connecting rod designs regardless of construction. Also, it is particularly adaptable to fractured cap rods because rod cap removal is not required for processing. It requires negligible weight change in the connecting rod or design change to the rest of the engine, and requires less oil pump demand than block squirters. Also, it packages within the space normally occupied by the connecting rod.

More specifically, the invention provides a connecting rod including a connecting rod body having a crank arm bore formed in a first end and a pin bore formed in a second end. A tube is connected to the body for carrying lubricant from the first end to the second end. The connecting rod body has a first drilled passage formed in the first end and a second drilled passage formed in the second end. The tube has opposing ends that are received in the first and second drilled passages.

The first passage intersects the crank arm bore, and the second passage intersects the pin bore. A plurality of spray holes are formed in the second end for spraying lubricant received from the tube onto a piston and cylinder bore. The spray holes may include a top hole for spraying a piston dome and side holes for spraying a piston skirt/cylinder bore interface.

In one embodiment, first and second bushing members are positioned in the wrist pin bore forming a channel therebetween and each having a plurality of squirt grooves formed therein. Lubricant is received from the second drilled passage into the channel and distributed through the plurality of squirt grooves for spraying onto the piston and piston skirt/cylinder bore interface.

The tube is preferably approximately 3 mm in internal diameter and preferably comprised of nylon or other suitable material. The tube may be attached to the body by tack welded straps, for example.

The first and second drilled passages are angled such that they are drilled without removing a rod cap.

In another embodiment, an annulus passage is formed in the second end on the pin bore intersecting the second drilled passage, and at least one spray hole is formed through the second end intersecting the annulus passage for spraying lubricant received from the tube onto a piston and/or piston skirt/cylinder bore interface, in addition to lubricating the wrist pin.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
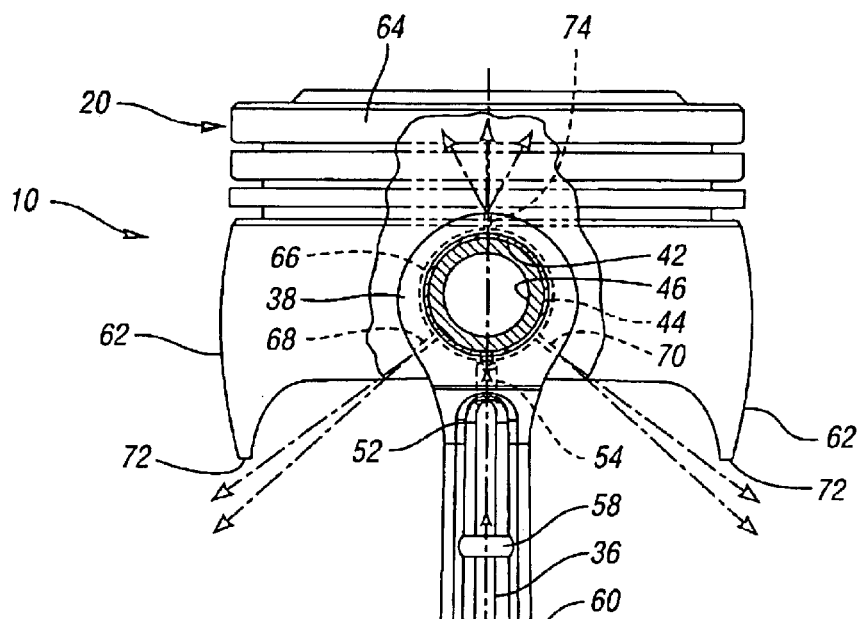
FIG. 1 shows a schematic front view of a connecting rod operatively connected to a piston and crankshaft in accordance with the invention.
Figure 1:
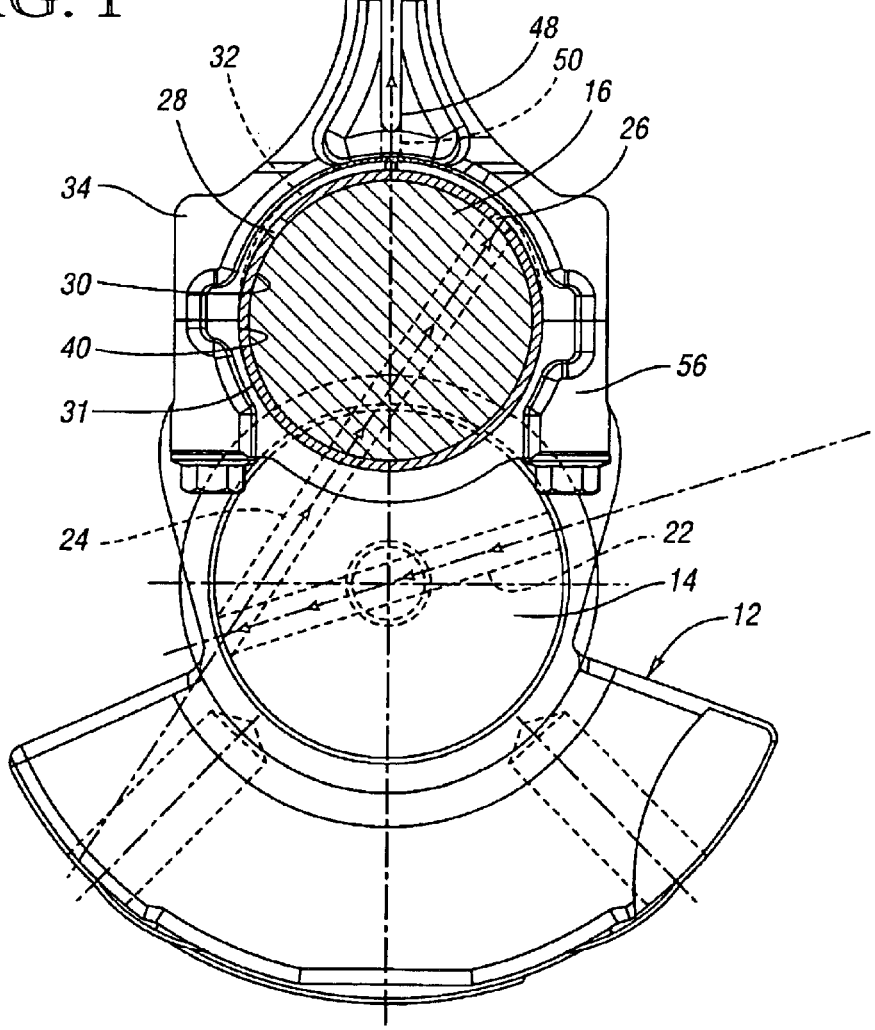

Referring to FIG. 1, a portion of an engine 10 is shown in accordance with the present invention illustrating a crank arm 12 on a crankshaft 14, which actuates a rod journal 16. Movement of the rod journal 16 actuates the connecting rod 18, which translates the piston 20 within a cylinder of the engine.

For lubrication, oil from the upper main bearing groove enters the main journal channel 22, and passes through the main journal of the crankshaft 14, through channel 24 within the crank arm 12, and into the rod journal 16. From channel 24, the oil passes through the openings 26, 28 in the upper rod bearing 30, and into the crescent shaped annulus 32 formed in the upper crank bore end 34 of the connecting rod 18. The crescent shaped annulus 32 is preferably machined to about 3 mm in width and about 1.5 mm at its deepest point.

A tube 36 is connected to the connecting rod 18 for carrying the oil from the annulus 32 of the crank bore end 34 to the pin bore end 38 of the connecting rod 18.

The crank bore 40 receives the upper and lower rod bearings 30, 31, and the pin bore 42 receives the bushing 44 and pin 46. The pin 46 is connected to the piston 20.

A first end 48 of the tube 36 is received within a first passage 50 formed in the crank bore end 34 of the connecting rod 18, and the second end 52 of the tube 36 is received within the second passage 54, which is formed in the pin bore end 38 of the connecting rod 18.

Figure 3:
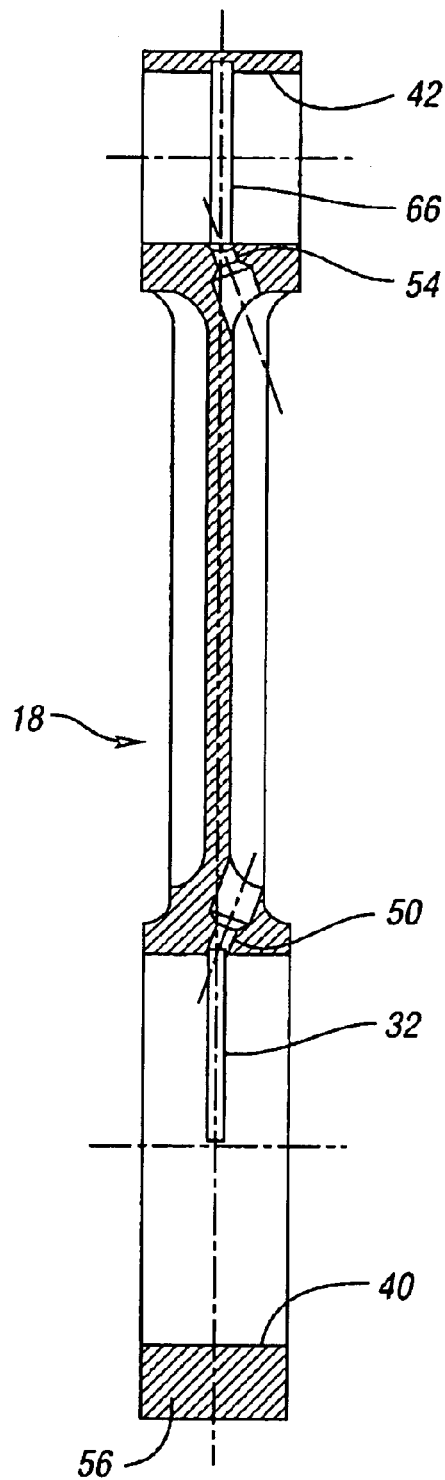
FIG. 3 shows a longitudinal cross-sectional side view of the connecting rod of FIG. 1.
Figure 4:
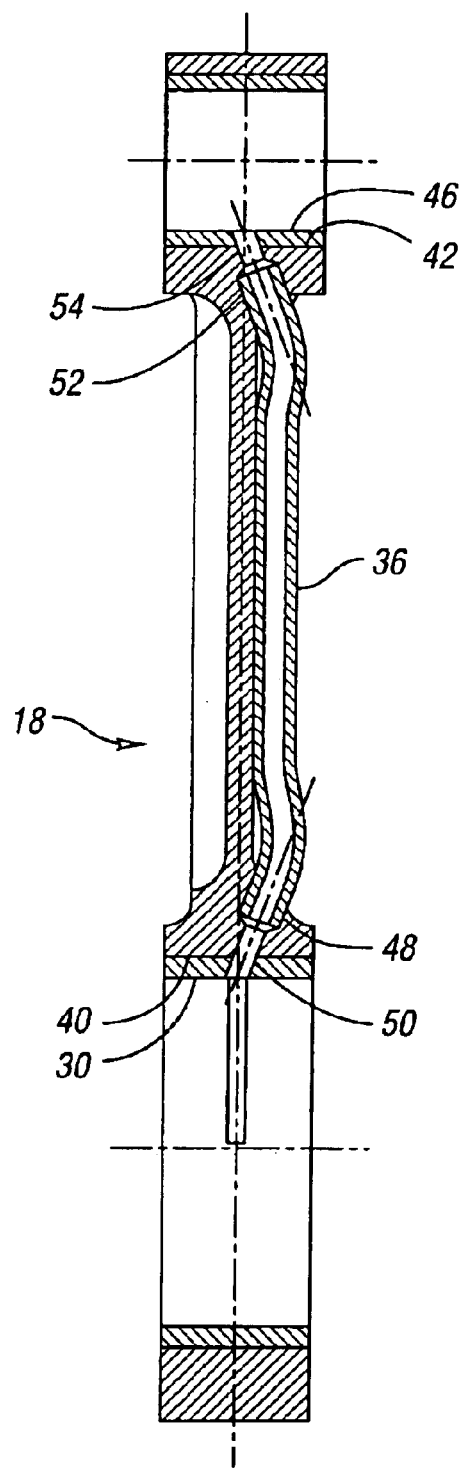
FIG. 4 shows a longitudinal cross-sectional side view of the connecting rod and tube of FIG. 1.

As shown most clearly in FIG. 3, the first and second passages 50, 54 are angle drilled, and are approximately 4 mm in diameter. Because the first passage 50 is angle drilled, it may be drilled without removal of the rod cap 56. The first passage 50 intersects the crank bore 40, and the second passage 54 intersects the pin bore 42. These passages may be step-drilled or single-size as deemed appropriate.

The tube 36 may be any appropriate material, metallic or non-metallic. In a preferred embodiment, the tube is a nylon tube approximately 3 mm in internal diameter. If the tube were plastic, a molded, barbed end with a light interference fit would suffice in attaching the tube to the passages 50, 54. If the tube were copper or ferrous material, the tube could be sealed by furnace brazing or silver soldering. This could also serve to fasten a metal tube to the column of the rod 18.

Figure 2:
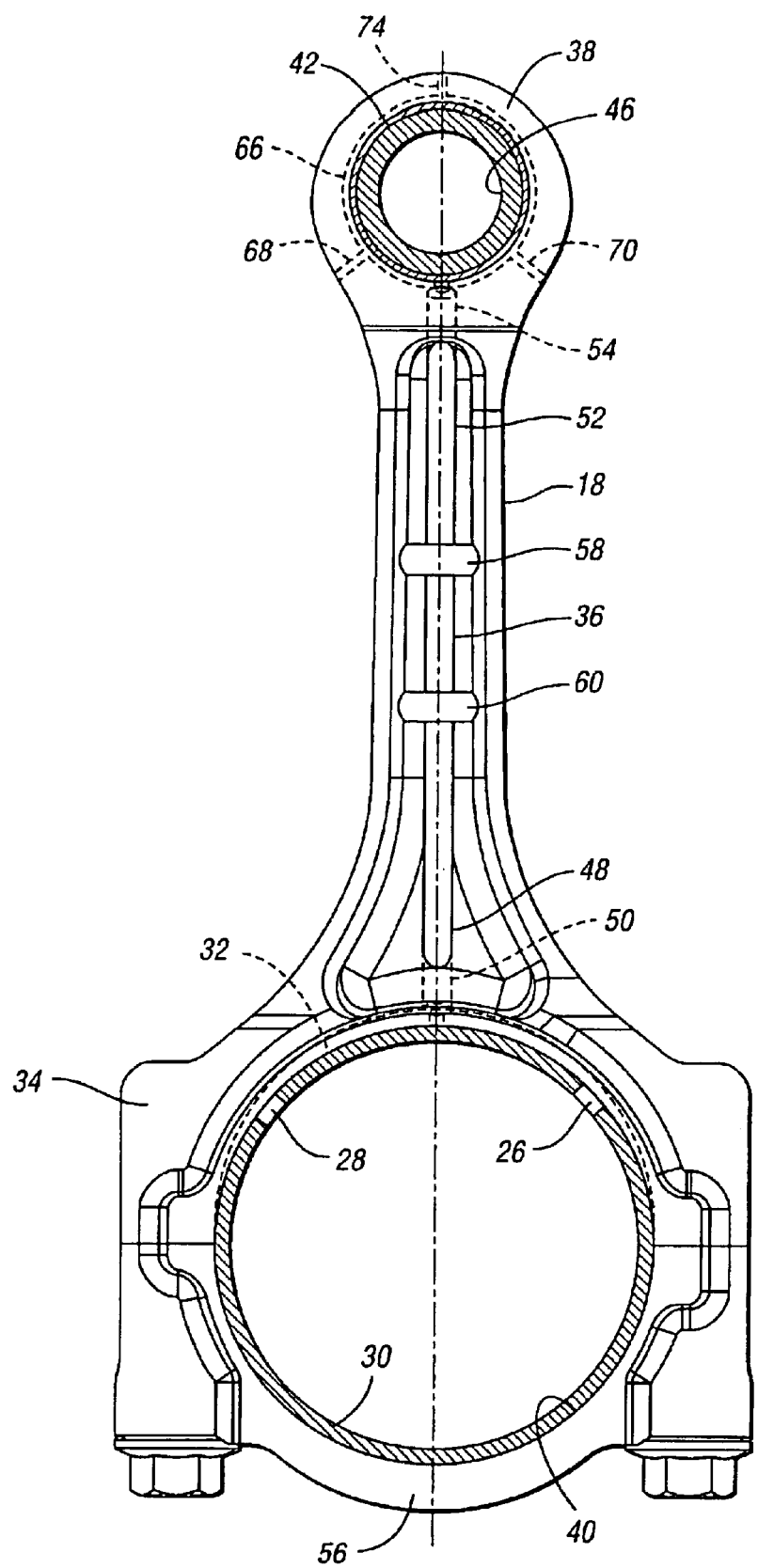
FIG. 2 shows a front view of the connecting rod of FIG. 1.

As shown in FIGS. 1 and 2, tack welded straps 58, 60 may be used to secure the tube 36 to the connecting rod 18. Alternatively, metal or plastic clips may be provided around the connecting rod's I-beam section to hold the tube firmly. Another means to affix the tubing would be to incorporate integral metal staking points along the length of the connecting rod. Thus, with the tube nestled in place, the fingers at the staking points could be mechanically peened over to retain the tube. Alternatively, as mentioned above, if a metal tube is used, brazing or soldering could be used for attachment. Regardless of the attachment and sealing method, the final diameter sizing for the crank arm bore 40 and wrist pin bore 42 should be machined after the tube installation to maintain design geometry. Thereafter, cleaning procedures would be required to clean out any machining debris.

The size, shape, position and number of ports, such as ports 26, 28, in the upper rod bearing shell 30 affect not only the quantity of oil delivered, but also determines the timing of the ultimate squirt at the opposite end of the connecting rod. The openings in the rod bearing 30 can be simple holes or elongated slots with the nominal diameter or width being on the order of 3 mm. A double squirt may be accomplished by having two openings 26, 28 in the rod bearing 30. Preferably, two 3 mm diameter holes are placed 30 degrees on either side of the vertical center line of the connecting rod. It is undesirable to locate the openings 26, 28 within plus or minus 20 degrees of the rod's centerline, as the openings 26, 28 can be detrimental to oil film thickness.

Features at the pin bore end 38 of the connecting rod 18 are application specific and depend upon explicit lubrication and cooling requirements. However, it is intended that the wrist pin 46 and piston skirt 62 be lubricated. Also, a jet of lubricant is provided for cooling the underside of the dome 64.

The second drilled passage 54 intersects the full annulus passage 66 machined at the center of the wrist pin bushing bore 42. This annulus 66 is about 3 mm wide and 1 mm deep. Once the pin bushing 46 is installed, the annulus 42 provides a 360 degree lube channel for communicating and disbursing the oil as desired. For example, a 3 mm hole within the bushing (for full floating pin designs) lubricates the pin 46 directly. Additionally, there are two strategically placed 1 mm diameter side holes 68, 70 which direct oil spurts with almost pin point accuracy along the cylinder walls just along the lower edge 72 of the piston skirt 62. These two oil streams are dedicated for lubricating the piston skirt-to-bore interface and are ideally placed for maximum control of piston skirt noise. Optimal skirt lubrication is achieved by locating these two angled jets in harmony with the appropriate rod angle (crank angle), such that the rod bearing hole 26 is in communication with the crank arm lube passage 24 when the piston is in the vicinity of,top dead center (TDC). Thus, on the piston's downstroke, the oil is swept into the skirt's thrust surfaces (i.e., the outer surfaces of the skirt 62). Also, indirectly, the piston pin bores are lubricated due to the abundance of lubrication contained within the piston's underside. The top hole 74 sprays the underside of the dome 64 to provide dome cooling.

Figure 5:
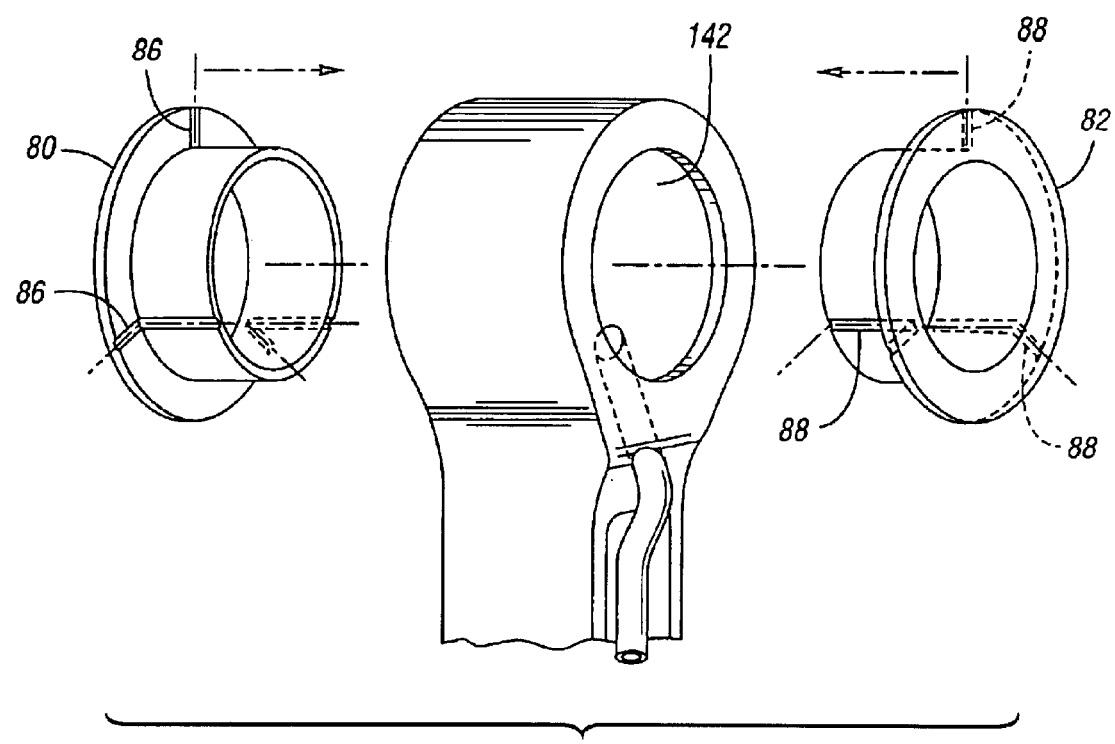
FIG. 5 shows a partial exploded perspective view of a pin bore end of a connecting rod and first and second bushing members engageable with the pin bore in accordance with an alternative embodiment of the invention.
Figure 6:
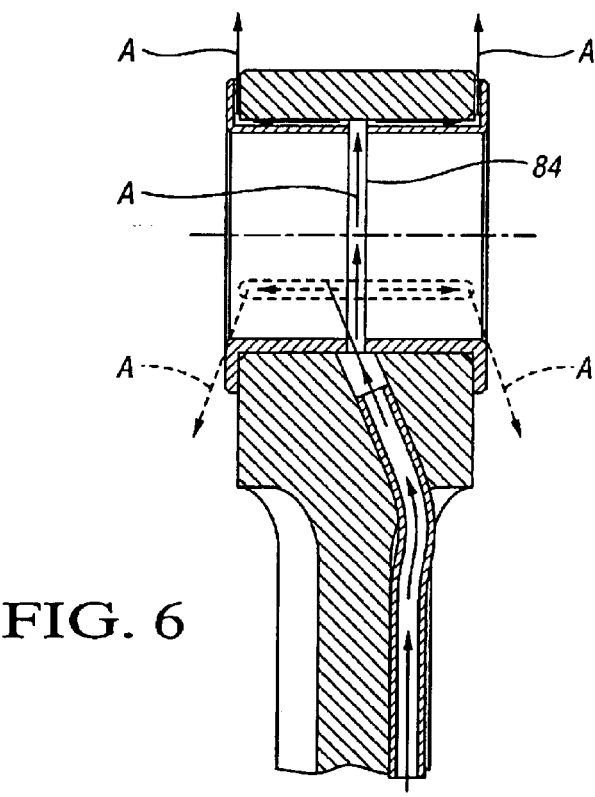
FIG. 6 shows a longitudinal cross-sectional side view of the assembly of FIG. 5.

FIGS. 5 and 6 illustrate an alternative embodiment wherein a split pin bushing is provided, including first and second bushing members 80, 82 which are positioned in the pin bore 142. The first and second bushing members 80, 82 cooperate to form a channel 84 therebetween, and each bushing member 80, 82 has a plurality of squirt grooves 86, 88 formed therein for distributing the lubricating fluid as illustrated by the arrows A of FIG. 6. This embodiment eliminates the need to cut the annulus 42 and side and top holes 68, 70, 74 of the previously described embodiment. This embodiment also provides wrist pin joint lubrication in addition to the piston dome cooling and the piston skirt/bore interface lubrication.

In summary, the invention provides an external tube on a connecting rod which conveys lubricant from one end of the connecting rod to another externally to the rod's column. The lubricating arrangement at the pin bore end of the connecting rod provides piston dome cooling, piston skirt lubrication, and wrist pin lubrication. The lubrication is well targeted and delivered directly to specific points of use, and is much less affected by crankcase windage than rod or block squirters. The design is readily adaptable to existing connecting rod designs regardless of construction. It is particularly adaptable to fractured cap rods because rod cap removal is not required for processing. The invention provides negligible weight change in the connecting rod and minimal design change to the rest of the engine. It also requires less oil pump demand relative to block squirters, and no added oil galleries are needed. It also packages within the space normally occupied by the connecting rod.

Further details regarding the manufacture of connecting rods may be found, for example, in U.S. Pat. No. 5,946,790, which is hereby incorporated by reference in its entirety.

While the best modes for carrying out the invention have been described in detail, those familiar with the art to which this invention relates will recognize various alternative designs and embodiments for practicing the invention within the scope of the appended claims.

What is claimed is:

1. A connecting rod comprising:
   a connecting rod body having a crank arm bore formed in a first end and a pin bore formed in a second end;
   a tube connected to the body for carrying lubricant from the first end to the second end, the tube being external to the body between the first and second ends; and
   a plurality of spray holes formed in the second end for spraying lubricant received from the tube onto a piston;
   wherein said plurality of spray holes comprises a top hole for spraying a piston dome and side holes for spraying a piston skirt.

2. The connecting rod of claim 1, wherein the connecting rod body has a first drilled passage formed in the first end and a second drilled passage formed in the second end, and said tube has opposing ends received in the first and second drilled passages, respectively.

3. A connecting rod comprising:
   a connecting rod body having a crank arm bore formed in a first end and a pin bore formed in a second end;
   a tube connected to the body for carrying lubricant from the first end to the second end, the tube being external to the body between the first and second ends;
   a plurality of spray holes formed in the second end for spraying lubricant received from the tube onto a piston;
   wherein the connecting rod body has a first drilled passage formed in the first end and a second drilled passage formed in the second end, and said tube has opposing ends received in the first and second drilled passages, respectively; and
   first and second bushing members positioned in the pin bore forming a channel therebetween and each having a plurality of squirt grooves formed therein, wherein lubricant is received from the second drilled passage into said channel and distributed to a piston dome and a piston skirt/bore interface through said plurality of squirt grooves.

4. A connecting rod comprising:
   a connecting rod body having a crank arm bore formed in a first end and a pin bore formed in a second end; and
   a tube connected to the body for carrying lubricant from the first end to the second end;
   wherein the tube is attached to the body by tack-welded straps.

5. A connecting rod comprising:
   a connecting rod body having a crank arm bore formed in a first end and a pin bore formed in a second end;
   a tube connected to the body for carrying lubricant from the first end to the second end;
   wherein the connecting rod body has a first drilled passage formed in the first end and a second drilled passage formed in the second end, and said tube has opposing ends inserted into the first and second drilled passages, respectively;
   wherein the tube is attached to the body by tack-welded straps.

6. A connecting rod comprising:
   a connecting rod body having a crank arm bore formed in a first end and a pin bore formed in a second end;
   a tube connected to the body for carrying lubricant from the first end to the second end, the tube being external to the body between the first and second ends;
   a plurality of spray holes formed in the second end for spraying lubricant received from the tube onto a piston;
   wherein the connecting rod body has a first drilled passage formed in the first end and a second drilled passage formed in the second end, and said tube has opposing ends received in the first and second drilled passages, respectively;
   wherein the first passage intersects the crank arm bore, and the second passage intersects the pin bore; and
   wherein the crank arm bore is configured to define a crescent-shaped annulus between the connecting rod body and an upper rod bearing disposed in the crank arm bore, the crescent-shaped annulus being in fluid communication with the first drilled passage such that lubricant is supplied to the first end through the crescent-shaped annulus.

7. The connecting rod of claim 6, wherein the upper rod bearing defines at least one opening displaced from a vertical centerline of the connecting rod body, said at least one opening being in fluid communication with the crescent-shaped annulus for distributing lubricant to the first end.

* * * * *